(12) United States Patent
Barth et al.

(10) Patent No.: US 9,689,126 B2
(45) Date of Patent: Jun. 27, 2017

(54) HAND-GUIDED WORK APPARATUS AND ASSEMBLY INCLUDING SAID HAND-GUIDED WORK APPARATUS AND A SUPPORT

(71) Applicant: Andreas Stihl AG & Co. KG, Waiblingen (DE)

(72) Inventors: Christian Barth, Korb (DE); Markus Hittmann, Weinstadt (DE); Thomas Maier, Unterensingen (DE); Johann Winterholler, Stuttgart (DE); Matti Schwalk, Tamm (DE); Felix Oberhofer, Stuttgart (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 15/003,636

(22) Filed: Jan. 21, 2016

(65) Prior Publication Data
US 2016/0208449 A1 Jul. 21, 2016

(30) Foreign Application Priority Data
Jan. 21, 2015 (DE) .......................... 10 2015 000 731

(51) Int. Cl.
*E01H 1/08* (2006.01)
*A01G 1/12* (2006.01)
*B25F 5/02* (2006.01)

(52) U.S. Cl.
CPC .......... *E01H 1/0809* (2013.01); *A01G 1/125* (2013.01); *B25F 5/02* (2013.01)

(58) Field of Classification Search
CPC .......... E01H 1/0809; E01H 1/08; E01H 1/12; A01G 1/125; B25F 5/02; A01D 34/90; A45F 3/14; A45F 2003/142; A45F 2203/144; A45F 2003/146; B65G 7/12
See application file for complete search history.

(56) References Cited

U.S. PATENT DOCUMENTS

| | | | | |
|---|---|---|---|---|
| 5,620,121 A | * | 4/1997 | Watson | A01D 34/902 172/370 |
| 5,913,464 A | * | 6/1999 | Haberlein | A45F 3/14 224/259 |
| 8,857,682 B2 | * | 10/2014 | Nakaya | A01D 34/902 224/257 |
| 8,925,774 B2 | * | 1/2015 | Mori | A01D 34/902 224/259 |

(Continued)

*Primary Examiner* — Dung Van Nguyen
(74) *Attorney, Agent, or Firm* — Walter Ottesen, P.A.

(57) ABSTRACT

An assembly includes a handheld work apparatus and a support. The support has a holder worn by an operator and a connector arrangement which is held at a first attachment on the holder and on a second attachment on the work apparatus. The connector arrangement is mounted on the second attachment so as to be pivotable about a pivot axis and supports the work apparatus in a rearward direction in relation to the operator and prevents a rearward movement of the work apparatus. The center of gravity of the work apparatus and the first attachment have a spacing (a) to one another measured in a horizontal and lateral direction in relation to the operator. The holder has, at the first attachment, a bracing device for supporting the tilting moment acting on the first attachment by the weight force (F) of the work apparatus because of the lateral spacing (a).

19 Claims, 11 Drawing Sheets

(56) References Cited

U.S. PATENT DOCUMENTS

| | | | |
|---|---|---|---|
| 9,101,201 B2* | 8/2015 | Hoche | A45F 3/14 |
| 2004/0065709 A1* | 4/2004 | Dillenberger | A45F 5/02 |
| | | | 224/682 |
| 2007/0181627 A1* | 8/2007 | Simonin | A45F 5/02 |
| | | | 224/671 |
| 2009/0090755 A1* | 4/2009 | Menzel | A45F 3/14 |
| | | | 224/268 |
| 2012/0131762 A1* | 5/2012 | Minor | A01G 1/125 |
| | | | 15/344 |
| 2014/0140861 A1 | 5/2014 | Pellenc | |
| 2014/0291362 A1 | 10/2014 | Victor | |

* cited by examiner

HAND-GUIDED WORK APPARATUS AND ASSEMBLY INCLUDING SAID HAND-GUIDED WORK APPARATUS AND A SUPPORT

CROSS REFERENCE TO RELATED APPLICATION

This application claims priority of German patent application no. 10 2015 000 731.9, filed Jan. 21, 2015, the entire content of which is incorporated herein by reference.

FIELD OF THE INVENTION

The invention relates to an arrangement having a handheld work apparatus and having a support device, wherein the work apparatus has a housing in which there is arranged a drive unit of the work apparatus and on which there is arranged at least one handle for the directing of the work apparatus during operation, wherein the support device is provided for supporting the work apparatus during operation and has a bracket for being worn by an operator, wherein the support device comprises a connector arrangement which is held on a first fastening point of the bracket and on a second fastening point on the work apparatus, wherein the connector arrangement is mounted on the second fastening point so as to be pivotable about at least one pivot axis, and wherein the connector arrangement supports the work apparatus, in the working position, in a rearward direction in relation to the operator, and prevents a rearward movement of the work apparatus, and to a handheld work apparatus having a fastening means, wherein the work apparatus has a housing in which there is arranged a drive unit of the work apparatus and on which there is arranged at least one handle for the directing of the work apparatus during operation, wherein the work apparatus comprises a connector arrangement which projects out of the housing and which is mounted on a fastening point so as to be pivotable about at least one pivot axis.

BACKGROUND OF THE INVENTION

United States patent application publication 2009/0090755 has disclosed a handheld work apparatus, specifically a brushcutter, having a strap arrangement. The brushcutter has a hook which is provided for hooking onto the strap arrangement. The hook forms, by way of the eyelet, a flexible connection by way of which the weight force of the work apparatus can be accommodated. During operation, the work apparatus is supported laterally on the carrying plate of the strap arrangement.

SUMMARY OF THE INVENTION

It is an object of the invention to provide an arrangement having a handheld work apparatus and having a support device. The arrangement makes it possible for work to be carried out using the work apparatus in an ergonomic and efficient manner. It is a further object of the invention to provide a handheld work apparatus with which efficient operation is possible.

With regard to the arrangement having a handheld work apparatus and having a support device, the object is achieved by way of an arrangement in which the center of gravity of the work apparatus and the first fastening point have, in the working position of the work apparatus, a spacing to one another measured in a horizontal direction and in a lateral direction in relation to the operator and the bracket has, at the first fastening point, equipment for at least partially supporting the tilting moment exerted on the first fastening point by the weight force of the work apparatus owing to the lateral spacing. With regard to the handheld work apparatus, the object is achieved by way of a handheld work apparatus in which the fastening point and the center of gravity of the work apparatus lie, in the working position of the work apparatus, in a common vertical plane, wherein the common vertical plane is oriented in the longitudinal direction of the work apparatus, and wherein the connector arrangement projects from the housing approximately horizontally and in a lateral direction relative to an operator.

The arrangement has a support device for supporting the work apparatus during operation. A connector arrangement is provided which is held on a first fastening point on a bracket, which is provided for being worn by the operator, and on a second fastening point on the work apparatus. The connector arrangement is mounted on the second fastening point so as to be pivotable about at least one pivot axis. It is provided that the center of gravity of the work apparatus and the first fastening point have, in the working position of the work apparatus, a spacing to one another measured in a horizontal direction and in a lateral direction relative to the operator. The first fastening point accordingly lies, relative to the operator, adjacent to the center of gravity of the work apparatus. The bracket has, at the first fastening point, equipment for at least partially supporting the tilting moment exerted on the first fastening point by the weight force of the work apparatus owing to the lateral spacing. Accordingly, the bracket accommodates not only the weight force but also the tilting moment generated at the first fastening point by the weight force. Here, the tilting moment is accommodated not on a holding plate or the like, on which the work apparatus is supported, but rather on the first fastening point itself. By virtue of the fact that the tilting moment is accommodated at least partially by the bracket at the first fastening point, the operator must, during operation, accommodate at most a part of the tilting moment. In this way, the work apparatus can be operated with less expenditure of force, such that fatigue-free operation is possible.

The lateral spacing between the center of gravity and the first fastening point is advantageously from approximately 5 cm to approximately 15 cm, in particular from approximately 7 cm to approximately 11 cm. A spacing of approximately 10 cm has proven to be particularly advantageous. In this way, it is possible for the work apparatus to hang substantially freely on the first fastening point without coming into contact laterally with the operator. At the same time, the tilting moment to be accommodated by the bracket is relatively low, such that a simple construction of the bracket is possible. It may be advantageous for the position of the second fastening point to be adjustable. For this purpose, the length, the configuration and/or the orientation of the connector arrangement are advantageously adjustable. A structurally fixedly predefined position of the second fastening point relative to the first fastening point may however also be advantageous. The position of the second fastening point on the work apparatus and/or the position of the first fastening point on the bracket may also be adjustable.

The second fastening point is preferably arranged within the housing. An arrangement of the second fastening point outside the housing may however also be advantageous. The second fastening point is advantageously arranged close to the center of gravity of the work apparatus. The horizontal spacing of the second fastening point to the center of gravity is advantageously as small as possible. In order for the tilting moment to be accommodated entirely on the first fastening point, it is advantageously provided that the second fastening point and the center of gravity of the work apparatus lie in a common vertical plane. The center of gravity particularly advantageously lies approximately vertically below the second fastening point. In this way, the work apparatus is held on the second fastening point in a balanced manner both in a lateral direction and in a forward direction, and can be pivoted out of the balanced position with very little expenditure of force by the operator. The weight force of the work apparatus is accommodated entirely on the first fastening point of the bracket.

The work apparatus is advantageously a blower which, during operation, conveys a blowing air stream through a blowing tube. The connector arrangement advantageously accommodates the recoil force generated during operation by the emerging blowing air stream. In particular in the case of a blower with high blowing power, the recoil force forms a major part of the forces that must be accommodated by the operator. By virtue of the fact that the connector arrangement accommodates the recoil force generated by the emerging blowing air stream during operation, it is possible for even a blower with very high blowing power to be operated in a substantially force-free manner. The load on the wrist of an operator, by way of which the recoil force is conventionally accommodated, is greatly reduced.

The horizontal spacing of the second fastening point to the longitudinal central axis of the blowing tube is advantageously as small as possible. In this way, pivoting of the blower upon starting or upon shutdown of the blower can be reduced. An advantageous arrangement is realized if the second fastening point and the longitudinal central axis of the blowing tube lie in a common vertical plane, in which the center of gravity also lies. This yields an advantageous orientation of the blower. If the blower is pivotably mounted on the second fastening point, the longitudinal central axis of the blowing tube and the second fastening point lie in the common vertical plane when the blower is in the rest position, that is, when no external forces act on the blower, that is, the blower is not in operation and the operator does not pivot the blower out of its rest position. Owing to the arrangement of the longitudinal central axis of the blowing tube in the plane in which the second fastening point and the center of gravity of the work apparatus lie, the operator has to impart only very low forces in order to hold and direct the blower during operation. An ergonomic arrangement is attained if the second fastening point lies, relative to the operator, behind the center of gravity of the work apparatus. In the case of an arrangement of the second fastening point behind the center of gravity of the work apparatus, the operator must themself bear a part of the weight force.

It is advantageously the case that the work apparatus, in the working position, has a spacing to the bracket measured in a lateral direction relative to the operator. By virtue of the fact that the work apparatus has a lateral spacing to the bracket and does not bear against the bracket, it is possible for the work apparatus to be freely pivoted during operation without the pivoting movement being impeded by the bracket. The connector arrangement is advantageously mounted on the second fastening point so as to be pivotable about a vertical pivot axis. The pivotability about the vertical pivot axis permits pivoting of the work apparatus in a horizontal plane. It is advantageously provided that the connector arrangement is mounted on the second fastening point so as to be pivotable about a horizontal pivoting axis. This permits a vertical pivoting movement of the work apparatus. A simple configuration is attained if the second fastening point is formed on a ball joint.

It is advantageously provided that the connector arrangement comprises a connecting pin. This yields a simple construction. In the working position, the connecting pin advantageously projects from the bracket approximately horizontally and in a lateral direction relative to the operator. Here, the connecting pin is in particular arranged movably in a housing receptacle of the work apparatus. The connector arrangement advantageously has equipment for centering the connecting pin in the housing receptacle. This is advantageous in particular if the connecting equipment is formed detachably on a fastening point, in particular on the first fastening point. The centering of the connecting pin simplifies the fixing of the connecting pin in a receptacle of the bracket.

Handheld work apparatuses are commonly carried on the right side of the body by right-handed operators, whereas left-handed operators often prefer to carry such apparatuses on the left side of the body. To permit an arrangement of the work apparatus both on the right side of the body and on the left side of the body, it is advantageously provided that the connecting pin can project out of the housing on opposite sides. Here, the connecting pin may project out of the housing on both sides of the housing permanently. It may however also be advantageous for the connecting pin to project out of the housing in each case only on one side of the housing, and to not project out of the housing on the opposite housing side. This prevents the operator being impeded by a connecting pin which projects out of the housing on the housing side averted from the operator.

To permit operation using the work apparatus even without the support device, it is advantageously provided that the connection between the work apparatus and the bracket at at least one fastening point is detachable. Depending on the configuration of the connector arrangement, it is possible here for the connection at the first fastening point or at the second fastening point to be detachable. It may also be provided that the connector arrangement itself is configured to be severable.

A simple configuration is obtained if the bracket has a receptacle for the connector arrangement, wherein the connector arrangement comprises a plate arranged on the first fastening point, which plate engages behind at least one rail of the receptacle. The bracket may for example be arranged on a holding plate provided for being worn on the leg of the operator. An arrangement on a waist strap or the like may also be expedient. It is advantageously possible for the bracket to be formed on a backpack arrangement. On the backpack arrangement there is advantageously held an energy storage unit which is connected to the work apparatus via an energy line. The energy storage unit is advantageously a battery, and the energy line is advantageously a cable. Some other energy storage unit, for example a fuel or gas tank, may however also be advantageous. The energy line is then a fuel line or a gas line. The drive motor of the work apparatus is arranged in the blower unit itself, and not on the backpack arrangement. In this way, the work apparatus can be detached from the backpack arrangement and is connected to the backpack arrangement only via the energy line, which exhibits high flexibility.

For a method for operating a work apparatus, in particular a blower, which is connected by way of a connector arrangement to a bracket provided for being worn by the operator, wherein the connector arrangement supports the work apparatus, in the working position, in a rearward direction relative to the operator and prevents a movement of the work apparatus in the rearward direction, wherein the blower has equipment for detecting whether or not the blower is connected to the bracket by way of the connector arrangement, it is provided that it is detected whether the blower is separated from the bracket, and that, if it is identified that the work apparatus is separated from the bracket, the maximum power available for the drive of the work apparatus is reduced in relation to the maximum power available for the drive of the work apparatus if the work apparatus is connected to the bracket.

The method for operating a work apparatus constitutes an independent inventive concept which is independent of the configuration of the connector arrangement.

The reduction of the maximum available power, that is, of the power available when an operating element is depressed to the maximum extent, yields a reduction in the recoil force. In this way, the force to be applied by the operator during operation can be reduced in a simple manner. The reduction of the maximum available power prevents a situation in which the operator has to permanently hold the operating element in a partially depressed position. This simplifies the operation and increases the ergonomics during operation.

For a handheld work apparatus having a fastening means, wherein the work apparatus has a housing in which there is arranged a drive unit of the work apparatus and on which there is arranged at least one handle for the directing of the work apparatus during operation, wherein the work apparatus comprises a connector arrangement which projects out of the housing and which is mounted on a fastening point so as to be pivotable about at least one pivot axis, it is provided that the fastening point and the center of gravity of the work apparatus, in the working position of the work apparatus, lie in a common vertical plane, wherein the common vertical plane is oriented in the longitudinal direction of the work apparatus, and wherein the connector arrangement projects from the housing approximately horizontally and in a lateral direction relative to an operator. The connector arrangement, which projects out approximately horizontally and in a lateral direction relative to the operator permits a connection of the work apparatus to a bracket, which at least partially, advantageously entirely, accommodates the tilting moment that arises owing to the spacing between the center of gravity and the bracket. In this way, easy, substantially force-free operation of the work apparatus is possible. The arrangement of the fastening point and of the center of gravity in the common vertical plane has the effect that the work apparatus is balanced in a lateral direction, such that the operator does not need to accommodate any forces and moments in a lateral direction. This permits working with low forces.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
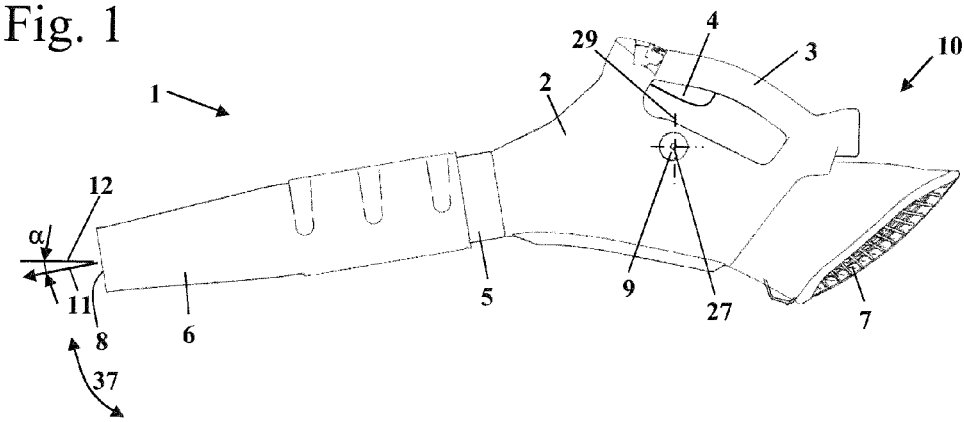
FIG. 1 is a schematic side view of a blower.

FIG. 1 shows a handheld, manually carried blower 1 as an embodiment of a handheld work apparatus. The work apparatus may, however, also be a brushcutter or the like. The blower 1 has a housing 2 on which a handle 3 is arranged. An operator-controlled lever 4 is pivotably mounted on the handle 3. On the housing 2 there is formed a blow tube 5 through which a blower unit 13 (FIG. 2) arranged in the housing 2 moves a blowing air stream. In the embodiment, a nozzle 6 is mounted on the blow tube 5. The nozzle 6 is advantageously exchangeable such that an operator can, for adaptation to the intended use of the blower 1, mount a nozzle 6 with the desired nozzle shape. On the nozzle 6 there is formed a blow-out opening 8 through which the blowing air stream exits the blower 1 in a blowing-out direction 11.

Figure 3:
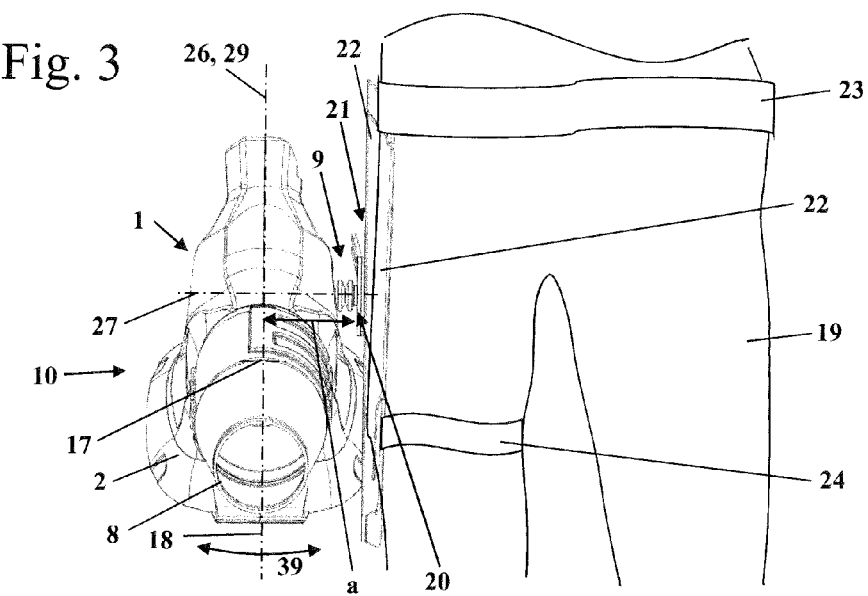
FIG. 3 is a schematic illustration of the blower and of a support device on an operator.

FIG. 1 shows the blower 1 in a working position 10. In the working position 10, the blowing-out direction 11 is inclined downward relative to a horizontal 12 by a blowing-out angle α. The blowing-out angle α may, for example, range from approximately 10° to approximately 70°. During operation, the operator pivots the blower 1 in a vertical direction, as indicated by the double arrow 37, such that the blowing-out direction 11 changes and the blowing air stream can be directed toward the material to be blown away. During operation, the blowing air stream is drawn in through an intake opening 7 which, in the working position 10, is situated to the side of and behind an operator 19 (FIG. 3). The blowing-out opening 8 is directed forward relative to the operator 19.

The blower 1 has a connector arrangement 9 which serves for connection to a bracket 21 (FIG. 3) on an operator 19. On the connector arrangement 9, the blower 1 is pivotable about a pivot axis 27 which, in the working position 10, runs horizontally, as will be discussed in more detail below.

Figure 2:
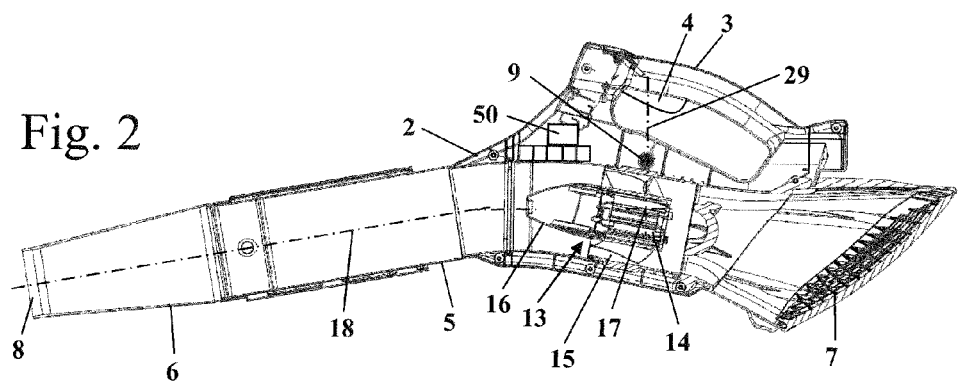
FIG. 2 is a sectional illustration through the blower from FIG. 1.

FIG. 2 shows the configuration of the blower 1 in detail. The blower unit 13 comprises a drive motor 14 which drives at least one fan impeller (not shown) in rotation. In the embodiment, the drive motor 14 is arranged in the blowing tube 5. Between the drive motor 14 and the blowing tube 5 there is arranged an annular-shaped space through which the fan impeller moves the working air stream. It may be advantageous for multiple fan impellers to be provided. The blower unit has, in the embodiment, a non-rotating guide wheel 15. Downstream of the fan impeller (not shown) and the guide wheel 15, there is provided a guide element 16 which is approximately in the form of a rounded cone and at the outer circumference of which the annular-shaped space widens. The blower unit 13 conveys the blowing air stream in the direction of a longitudinal central axis 18 of the blowing tube 5. In the embodiment, the blower unit 13 is in the form of an axial blower. An embodiment as a diagonal blower may however also be advantageous. In this case, the inflow direction into the blower and the outflow direction out of the blower run approximately in the same direction.

A controller 50 arranged in the housing 2 serves for the control of the drive motor 14. Downstream of the guide element 16, the blowing tube 5 runs with a slight downward curvature in the working position 10, whereas, in the embodiment, the nozzle 6 is of straight or linear form.

The blower 1 has a center of gravity 17 which, in the embodiment, lies in the region of the drive motor 14. Some other position of the center of gravity 17 may also be advantageous. Here, different nozzles 6 may result in different positions of the center of gravity 17. The blower 1 is configured such that the center of gravity 17 lies, in the working position 10, below the handle 3. In this way, during operation, the operator must accommodate at most a small tilting moment about the horizontal pivot axis 27 (FIG. 1) or about a pivot axis running in the longitudinal direction of the blower 1. The connector arrangement 9 furthermore has a vertical pivot axis 29, which likewise passes through the center of gravity 17 and intersects the handle 3.

FIG. 3 schematically shows an arrangement of the blower 1 on an operator 19. The blower 1 is supported on the operator 19 by way of a support device 20. The support device 20 includes a holding plate 22 which, in the embodiment, is worn by the operator by way of a waist strap 23 and a leg strap 24. Some other attachment of the holding plate 22 may also be advantageous, for example exclusively by way of a waist strap or on a strap arrangement which also comprises shoulder straps and/or further straps. On the holding plate 22 there is formed the bracket 21, on which the connector arrangement 9 is held. As shown in FIG. 3, the vertical pivot axis 29 is arranged in a vertical plane 26 which encompasses the longitudinal central axis 18 of the blowing tube 5 (FIG. 2). In the working position 10, the vertical plane 26 has a spacing (a), measured in a horizontal direction and in a lateral direction relative to the operator, to the bracket 21. The blower 1 thus hangs beside the operator 19 during operation. The blower 1 is supported on the operator 19 exclusively by way of the bracket 21 and the holding plate 22. Here, the housing 2 of the blower 1 does not bear against the holding plate 22. The support is realized exclusively via the connector arrangement 9.

FIG. 3 also shows the horizontal pivot axis 27. The spacing (a) is measured parallel to the horizontal pivot axis 27. The center of gravity 17 advantageously lies close to the vertical plane 26 which encompasses the longitudinal central axis 18 of the blowing tube 5. In the embodiment, the center of gravity 17 lies in the vertical plane 26. During operation, the operator 19 pivots the blower 1 also about the vertical pivot axis 29. In this case, the blowing-out opening 8 moves to the right and to the left, as indicated by the double arrow 39. Owing to the spacing (a), the pivoting movements in the directions of the double arrows 37 and 39 can be performed without impairment of the movement by the holding plate 22.

Figure 4:
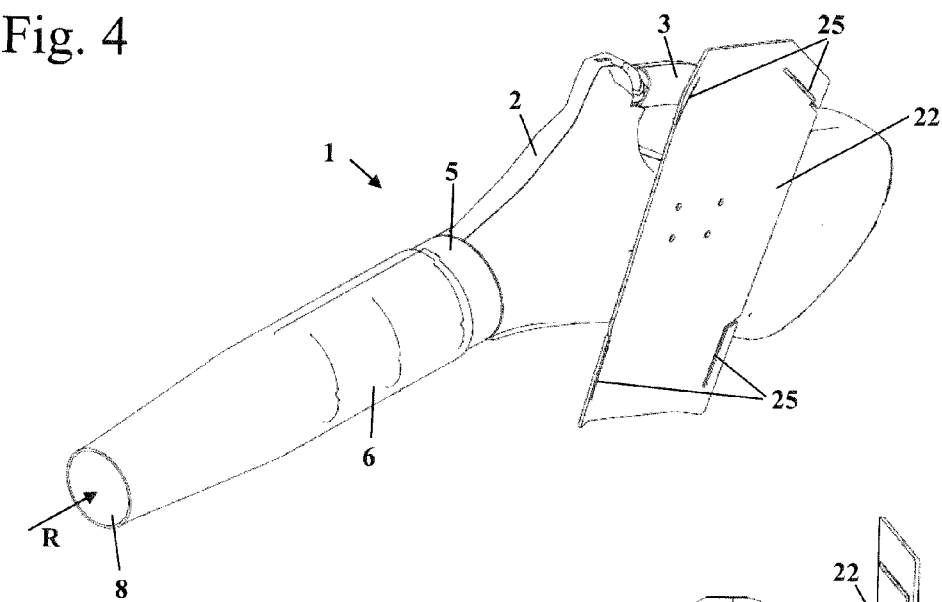
FIGS. 4 and 5 are perspective illustrations of the blower with the support device.

As shown in FIG. 4, the holding plate 22 has slots 25 for the fixing of the waist strap 23 and of the leg strap 24. FIG. 4 also schematically shows the recoil force R exerted on the blower 1 by a blowing air stream which emerges from the blowing-out opening 8 during operation. The recoil force R is, during operation, accommodated entirely by way of the connector arrangement 9, and is directed into the bracket 21 and into the holding plate 22. The recoil force R is thereby taken up by the leg of the operator 19, and not by way of a hand arranged on the handle 3. In this way, the load on the operator, in particular at the wrist, is kept low.

Figure 5:
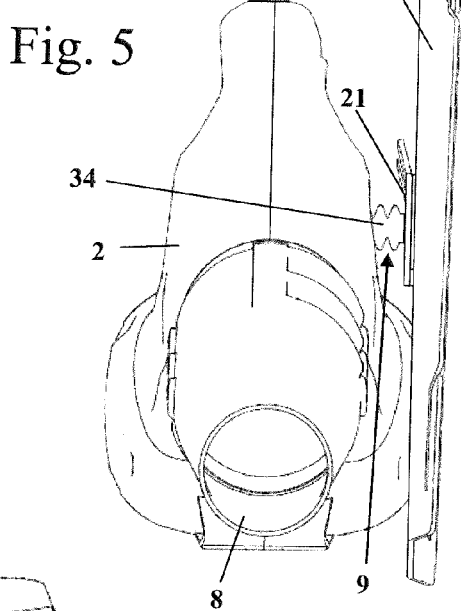
Figure 6:
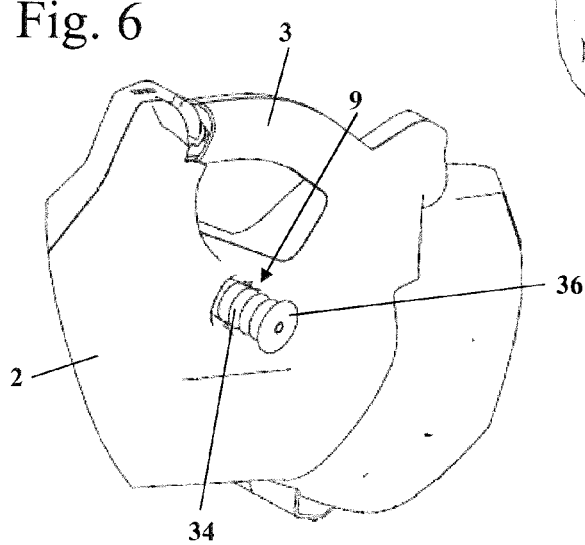
FIG. 6 is a perspective detail illustration of the blower in the region of the connector arrangement.

As shown in FIG. 5, the connector arrangement 9 includes a bellows 34 which will be described in more detail hereinafter. As shown in FIG. 6, a plate 36 is arranged on that end of the bellows 34 which projects out of the housing 2.

Figure 7:
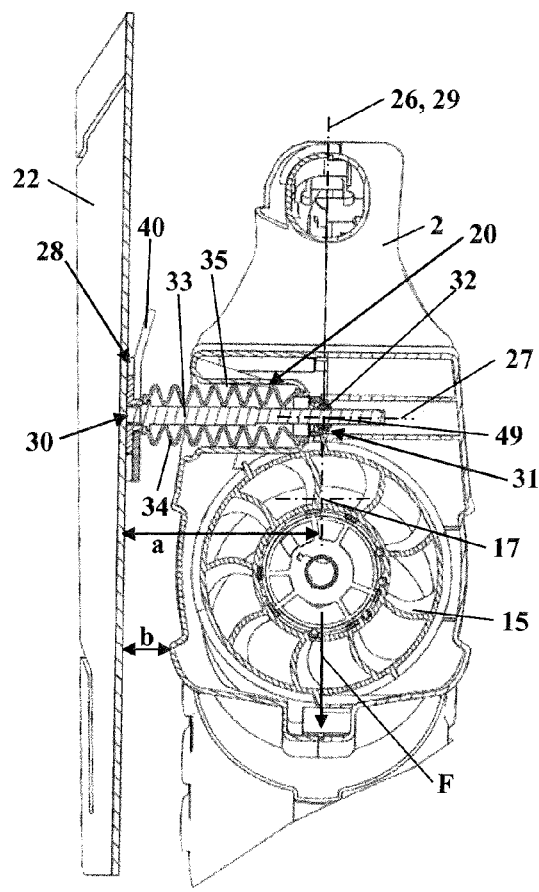
FIG. 7 is a section through the blower and the support device.
Figure 8:
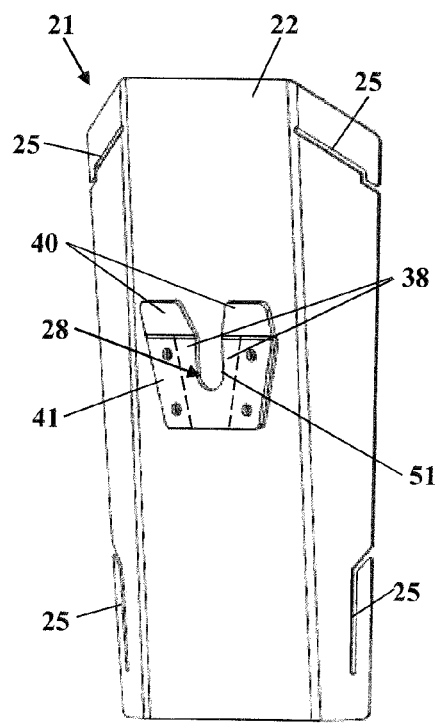
FIG. 8 is a perspective illustration of the bracket of the support device.

The sectional illustration in FIG. 7 shows the construction in detail. The connector arrangement 9 includes a connecting pin 33 which is fixed, at a first fastening point 30, to the holding plate 22 and, at a second fastening point 31, to the blower 1. The first fastening point 30 is formed by a receptacle 28 on the holding plate 22. As also shown in FIG. 7, insertion aids 40 are provided above the receptacle 28, which insertion aids are in the form of sheet-metal sections which project obliquely from the holding plate 22, as is also shown in FIG. 8. At the second fastening point 31 there is provided a ball joint 32 by way of which the blower 1 is mounted pivotably relative to the connecting pin 33. Here, the ball joint 32 permits pivoting movements about the vertical pivot axis 29 and about the horizontal pivot axis 27. Tilting of the blower 1 about an axis 49 running approximately parallel to the longitudinal central axis 18 (FIG. 2) and through the ball joint 32 is also possible over a small angle range.

As shown in FIG. 7, the connecting pin 33 is surrounded by the bellows 34. The connecting pin 33 projects into a housing receptacle 35 which is formed as a depression in the housing 2. The ball joint 32 is provided on the base of the housing receptacle 35. The second fastening point 31 is provided centrally in the housing 2 and lies, together with the center of gravity 17, on the vertical pivot axis 29. The second fastening point 31 lies, together with the center of gravity 17, in the vertical plane 26 and close to the longitudinal central axis 18 of the blowing tube 5 (FIG. 3). In the embodiment, the longitudinal central axis 18 lies in the vertical plane 26. The bellows 34 effects centering of the connecting pin 33 in the housing receptacle 35. In this way, the connecting pin 33 projects out of the housing 2 of the blower 1 approximately perpendicularly to the vertical plane 26.

As shown in FIG. 7, the vertical plane 26 has the spacing (a) to the holding plate 22. The spacing (a) is measured perpendicularly to the vertical plane 26. The blower 1 is held on the ball joint 32 so as to swing freely in a structurally predefined angle range. As shown in FIG. 7, the housing 2 of the blower 1 has a lateral spacing (b) to the holding plate 22, and does not make contact with the holding plate 22 in the working position 10. The spacing (b) is selected so as to provide adequate mobility of the blower 1 during operation. The spacing (a) advantageously ranges from approximately 5 cm to approximately 15 cm, in particular from approximately 7 cm to approximately 11 cm. A spacing (a) of approximately 10 cm has proven to be particularly advantageous. FIG. 7 also shows the weight force F of the blower, which acts vertically downward from the center of gravity 17. The weight force F exerts a tilting moment on the first fastening point 30. The tilting moment is taken up entirely by the receptacle 28.

As shown in FIG. 8, in the embodiment, the receptacle 28 is in the form of a metal sheet 41, which has an approximately vertical slot 51 for the connecting pin 33. The metal sheet 41 is fixed to the holding plate 22 so to be at a spacing to the holding plate 22. In the embodiment, for this purpose, shim washers 42 (shown in FIG. 9) are placed between the holding plate 22 and the metal sheet 41. Those edges of the metal sheet 41 which delimit the slot 51 form lateral rails 38, behind which the plate 36 is guided. Owing to the relatively great extent of the plate 36 in the vertical direction, the tilting moment exerted on the first fastening point 30 by the weight force F is introduced by the plate 36 into the rails 38, and thus into the holding plate 22. Here, the plate 36 is connected to the connecting pin 33 fixedly and so as to be immovable under the forces that commonly act during operation. In this way, the weight force F of the work apparatus is supported on the first fastening point 30.

Figure 9:
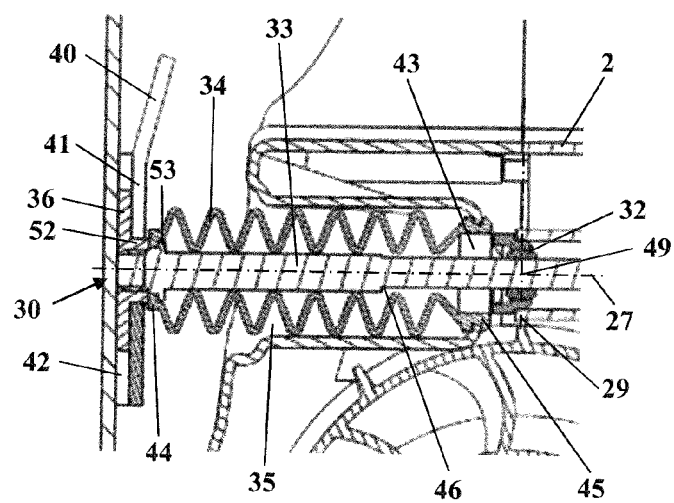
FIG. 9 is an enlarged detail illustration of the connector arrangement from FIG. 7.

FIG. 9 shows the configuration of the connector arrangement 9 in detail. The bellows 34 has a first end 44 which is held between a collar 52 on the plate 36 and a thickened portion 53 of the connecting pin 33. The first end 44 of the bellows 34 is in this case held with a small spacing to the plate 36, such that the metal sheet 41 can engage between the first end 44 of the bellows 34 and the plate 36. A second end 45 of the bellows 34 is held on the housing 2 at the outer periphery thereof. The second end 45 is pressed against the wall of the housing 2 by a ring 43 arranged in the bellows 34. As also shown in FIG. 9, the connecting pin 33 has a shoulder 46 at which the diameter of the connecting pin 33 increases in the direction of the first fastening point 30. The shoulder 46 forms a stop for the connecting pin 33. The connecting pin 33 can be pushed into the ball joint 32 as far as the shoulder 46.

Figure 10:
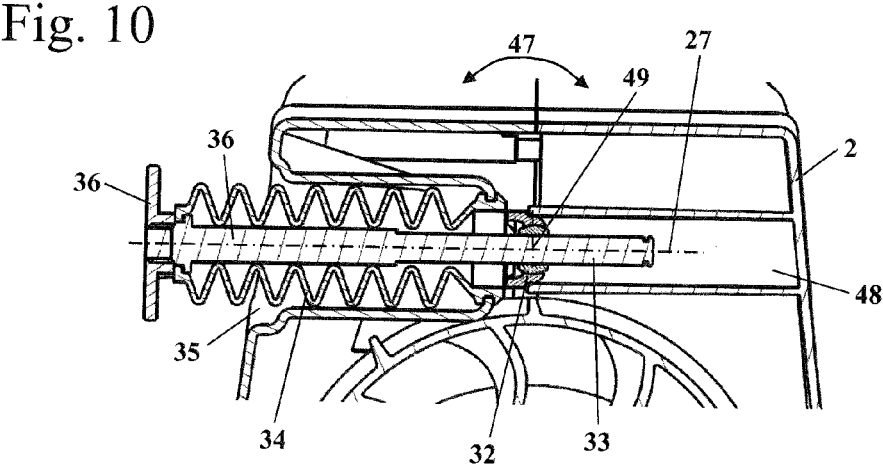
FIG. 10 is an illustration corresponding to FIG. 9 without the bracket.
Figure 11:
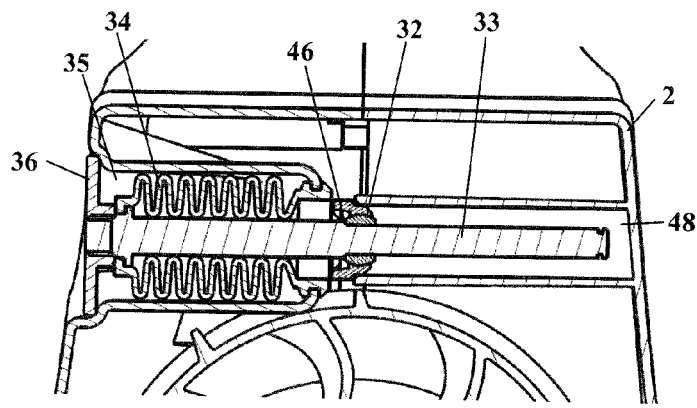
FIG. 11 is a sectional illustration of the connector arrangement in a state in which it has been pressed into the housing.

The tilting movement of the blower 1 about the axis 49 is indicated in FIG. 10 by a double arrow 47. As shown in FIGS. 10 and 11, in the illustrated vertical section plane through the connecting pin 33, the internal diameter of the housing receptacle 35 approximately corresponds to the outer diameter of the bellows 34. In this way, the pivoting movement about the axis 49 in the direction of the double arrow 47 is limited by the bellows 34. Tilting movements about the axis 49 are possible only to the extent permitted by the elasticity of the bellows 34.

As is also shown in FIG. 10, a receiving chamber 48 is formed in the housing 2 on that end of the connecting pin 33 which faces away from the plate 36. If the connector arrangement 9 is not required, the connecting pin 33 can be pushed into the housing 2 until the position shown in FIG. 11 is reached. The free end of the connecting pin 33 projects into the receiving chamber 48. The bellows 34 is compressed as the connecting pin 33 is slid into the housing 2. In the position in which it has been pushed into the housing 2, the plate 36 terminates approximately flush with the outer side of the housing 2 and, in the section plane shown in FIG. 11, substantially closes off the housing receptacle 35.

Figure 12:
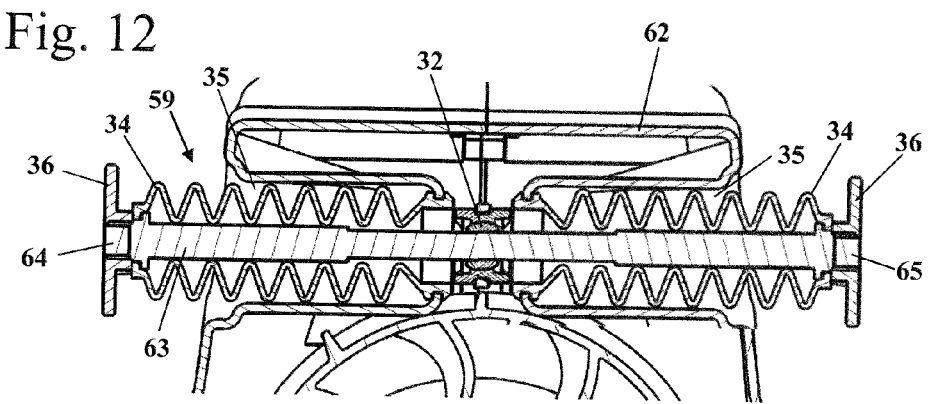
FIG. 12 is a section view of an embodiment of a connector arrangement.

FIG. 12 shows an embodiment of a connector arrangement 59 which includes a connecting pin 63. The connector arrangement 59 is provided on a blower which has a housing 62. Here, the construction of the blower corresponds substantially to the blower 1 shown in the preceding figures. Elements which correspond to one another are denoted by the same reference numerals throughout the figures. The housing 62 in FIG. 12 has two housing receptacles 35 which are open toward opposite sides of the housing 62. The connecting pin 63 projects through the housing 62. A first end 64, which projects out of the housing 62, of the connecting pin 63 bears a plate 36. That end 65 of the connecting pin 63, which projects out of the housing 62 on the opposite side, likewise bears a plate 36. In this way, the connecting pin 63 can be arranged both on a bracket 21 arranged on the right side of an operator 19 and on a bracket 21 arranged on a left side of the operator 19. In this way, the blower from FIG. 12 can be operated equally by right-handed and left-handed operators. It may be provided that the connecting pin 63 projects out of the housing 62 only on one side of the housing 62, and that the connecting pin 63 is displaceable in its longitudinal direction, such that the connecting pin 63 projects out of the housing 62 selectively on one housing side or on the other housing side.

Figure 13:
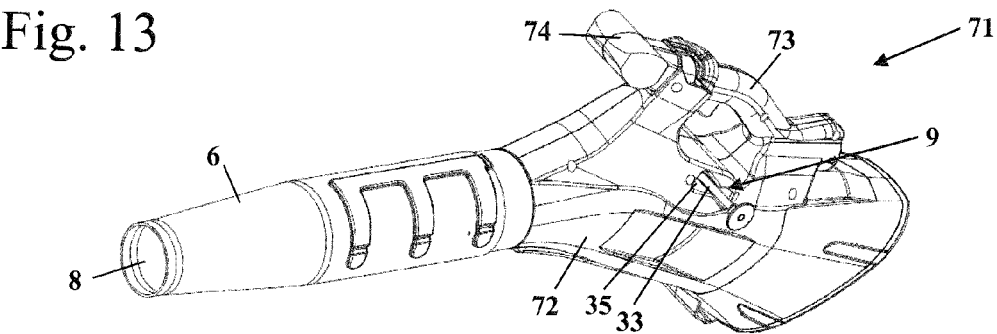
FIG. 13 is a perspective view of an embodiment of a blower.
Figure 14:
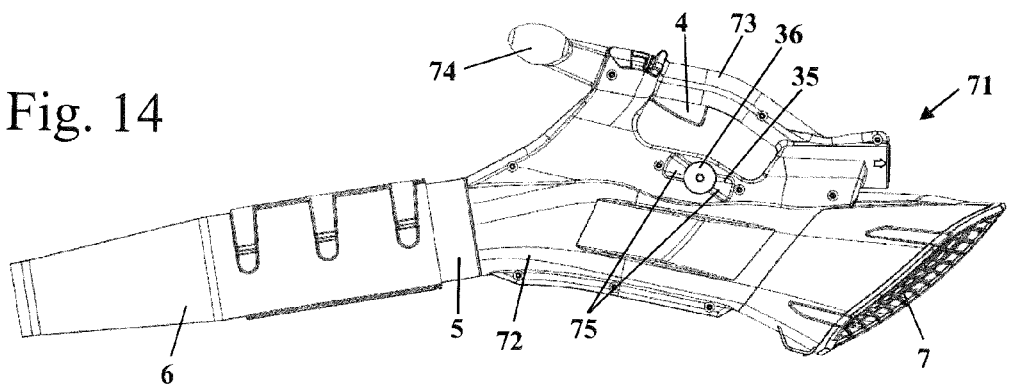
FIG. 14 is the blower from FIG. 13 in a side view.

FIGS. 13 and 14 show an embodiment of a blower 71, the construction of which corresponds substantially to that of the blower 1. The configuration of the connector arrangement 9 also corresponds to that of the blower 1. The bellows 34 is not shown in the figures. As shown in FIG. 13, the blower 71 has a housing 72 on which there is arranged a handle 73. A directing grip 74 is arranged on the housing 72 at the forward-facing side of the handle 73. If the blower 71 is fixed to the holding plate 22 by way of the support device 20, the blower 71 is suspended in balanced fashion. The operator can thus pivot the blower 71 in a horizontal and vertical direction, and thereby divert the blowing air stream in the desired blowing-out direction, by exerting merely light pressure on the directing grip 74 by hand. In this way, low-fatigue working is possible even in the case of a blower 71 of very high blower power.

FIGS. 13 and 14 also show the configuration of the housing receptacle 35. The housing receptacle 35 has two sections 75 which are of approximately circular segment-shaped form. In a working position 10 and in relation to an operator wearing the blower 71, one section 75 projects forward from a central position of the connecting pin 33, and another section 75, which is likewise of circular segment-shaped form, projects rearward. In this way, the blowing-out opening 1 of the blower 71 can be pivoted to the right and to the left relative to the connecting pin 33. The configuration of the housing receptacle 35 in this case determines the possible pivot angle for the blower 71. The walls of the housing receptacle 35 form a stop for the bellows 34 (not shown in FIGS. 13 and 14).

Figure 15:
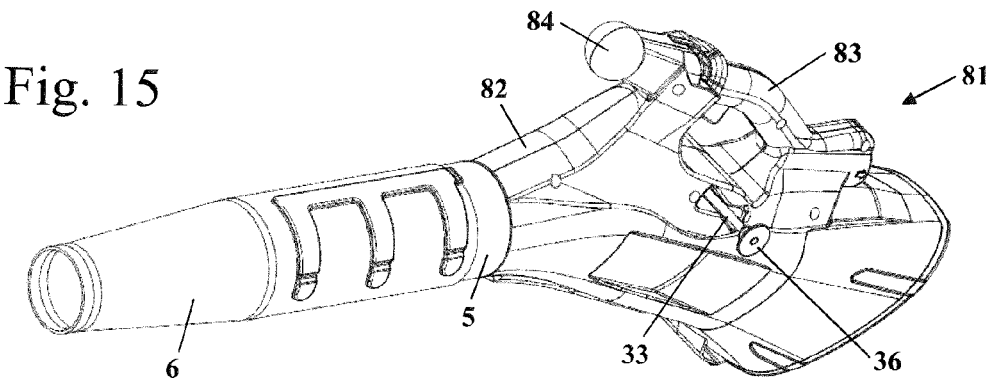
FIG. 15 is a perspective illustration of a further embodiment of a blower.
Figure 16:
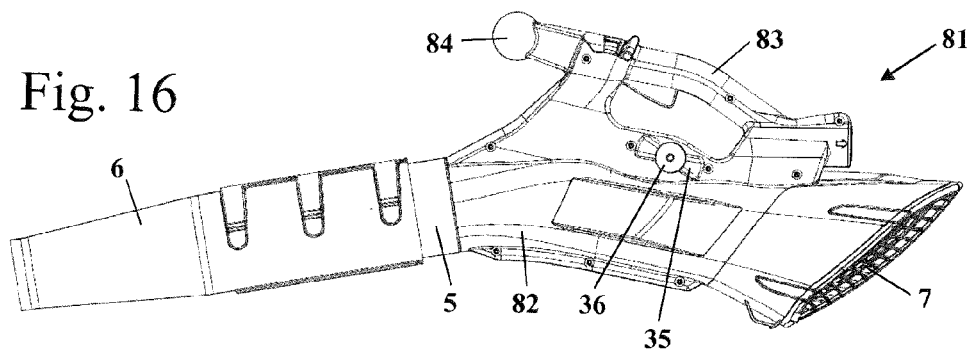
FIG. 16 is the blower from FIG. 15 in a side view.

FIGS. 15 and 16 show an embodiment of a blower 81, on the housing 82 of which there is provided a handle 83 and a directing grip 84 arranged in front of the handle 83. Whereas the directing grip 74 has a flattened form, the directing grip 84 has an approximately spherical form.

The blower 1, 71 and 81 have an electric drive motor 14. For the supply of energy to the drive motor 14, a battery may be arranged on the blower (1, 71, 81). To be able to achieve high levels of blower power for adequately long working periods, a relatively large battery is required. To avoid an excessive weight of the blower (1, 71, 81), a backpack battery may be provided, which is connected to the blower (1, 71, 81) via an energy line.

Figure 17:
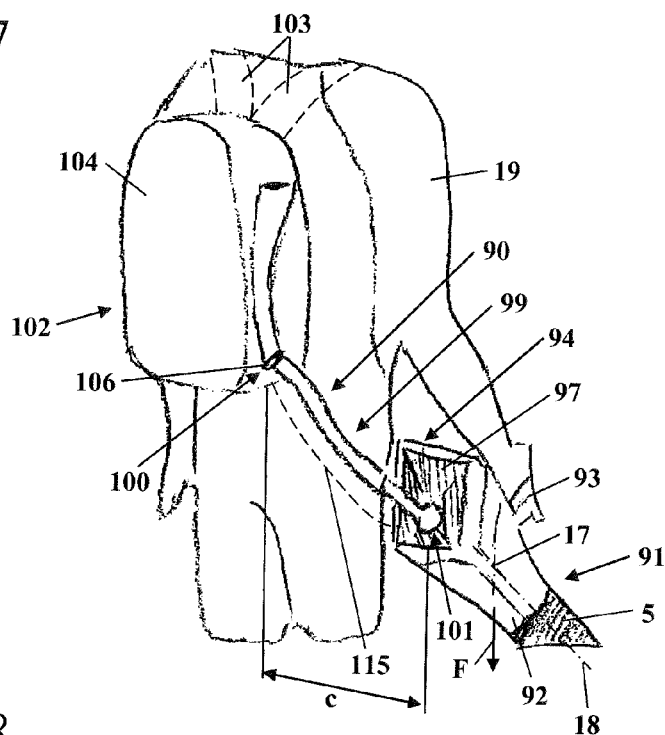
FIG. 17 is a schematic perspective illustration of a blower having a support device on an operator.

FIG. 17 shows an embodiment of a blower 91, which is connected to a backpack arrangement 102 by way of a support device 90. The blower 91 has a housing 92 on which there is provided a handle 93. The handle 93 is, like the handles of the blowers (1, 71, 81), arranged on the top side of the housing 92, and oriented in a longitudinal direction of the blower 91, that is, approximately parallel to the longitudinal central axis 18 of the blowing tube 5 (FIG. 2). An operator 19 directs the blower 91 during operation by way of the handle 93. The handle 93 lies approximately above the center of gravity 17.

The backpack arrangement 102 comprises shoulder straps 103 which are shown schematically in FIG. 17 and by way of which the backpack arrangement 102 is worn by the operator on his or her back. On the backpack arrangement 102 there is provided an energy storage unit 104, which is schematically shown in FIG. 17. The energy storage unit 104 is advantageously a battery. The energy storage unit 104 for is connected to the blower 91 by way of an energy line 115, in particular an electrical cable. The support device 90 comprises a connector arrangement 99 which is fixed, at a first fastening point 100, to the backpack arrangement 102 and, at a second fastening point 101, to the blower 91. The second fastening point 101 is in this case provided on an intake opening 97 of the blower 91, which is arranged on that side of the blower 91 which faces rearward relative to the operator 19 during operation, that is, on that side of the blower 91 which is averted from a blowing-out opening. The second fastening point 101 lies, together with the center of gravity 17, in a vertical plane which encompasses the longitudinal central axis 18 of the blowing tube 5. The second fastening point 101 is arranged so as to be offset rearward relative to the center of gravity 17. In the embodiment as per FIG. 17, the first fastening point 100 is arranged on that vertical side of the backpack arrangement 102 which faces toward the blower 91. The first fastening point 100 has a spacing (c), measured in a lateral direction and horizontally, to the second fastening point 101. The backpack arrangement 102 forms a bracket, which is worn by the operator 18, for the connector arrangement 99.

The connector arrangement 99 is in the form of a rod which projects out laterally and obliquely downward. At the first fastening point 100, there is provided a pivot joint 106 by way of which the connector arrangement 99 can be folded upward. However, proceeding from the position shown in FIG. 17, the connector arrangement 99 cannot be folded further downward. In this way, the connector arrangement 99 can partially accommodate the weight force F of the blower 91 and can fully accommodate the tilting moment generated owing to the lateral spacing c between the center of gravity 17 and the first fastening point 100.

FIG. 17 shows the arrangement in a connected state in which the blower 91 is connected by way of the connector arrangement 99 to the backpack arrangement 102. In the state, the connector arrangement 99 accommodates the recoil force R (FIG. 18) generated by the emerging blowing air stream and accommodates a part of the weight force F and the tilting moment generated by the weight force F owing to the spacing (c). The tilting moment exerted owing to the position of the center of gravity 17 in front of the second fastening point 101 is not accommodated by the connector arrangement 99, but must be held by the operator 19.

Figure 18:
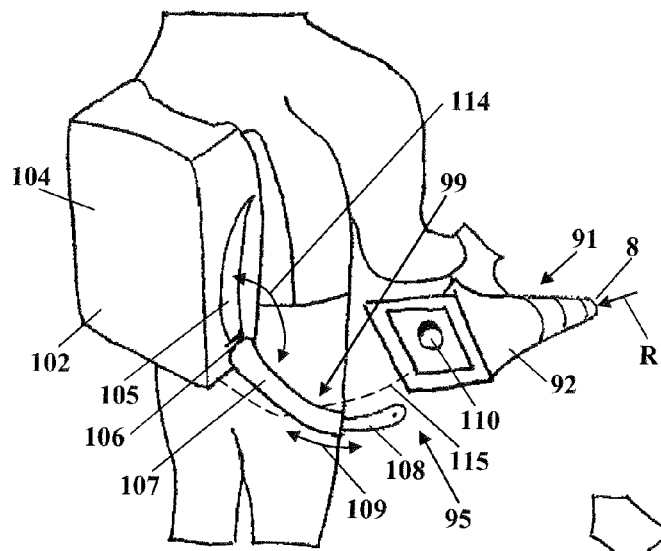
FIG. 18 is the arrangement from FIG. 17 with a severed connector arrangement.

FIG. 18 shows the arrangement in a disconnected state 95. In the disconnected state 95, the blower 91 is not connected by way of the connector arrangement 99 to the backpack arrangement 102. There is merely a connection via the energy line 115, via which no forces are accommodated. In the embodiment, the blower 91 is separated from the connector arrangement 99 at the second connecting point 101. It may however also be provided that the blower 91 is separated from the backpack arrangement 102 at the first connecting point 100, and the connector arrangement 99 is fixedly held on the blower 91.

As shown in FIG. 18, the connector arrangement 99 comprises a first section 107, which is held on the backpack arrangement 102 by way of the pivot joint 106. The connector arrangement 99 furthermore comprises a second section 108 which can be inserted in telescopic fashion into the first section 107, as indicated by the double arrow 109. In this way, the length of the connector arrangement 99, and thus the position of the second fastening point 101 during operation, can be adjusted. The position of the sections 107 and 108 relative to one another can advantageously be fixed, such that the weight force F is also partially accommodated by the connector arrangement 99.

As shown in FIG. 18, the backpack arrangement 102 has a depression 105 on the vertical side facing toward the blower 91. The connector arrangement 99 can, in the disconnected state 95, be transferred into a transport position in which the section 108 is pushed into the section 107 and, subsequently, the section 107 is folded upward until the section 107 bears against the backpack arrangement 102 and is arranged at least partially in the depression 105. The folding-up of the section 107 is indicated by a double arrow 114.

As shown in FIG. 18, the housing 92 of the blower 91 has, on the side averted from the blowing-out opening 8, a depression 110 at which the second fastening point 101 is formed.

Figure 19:
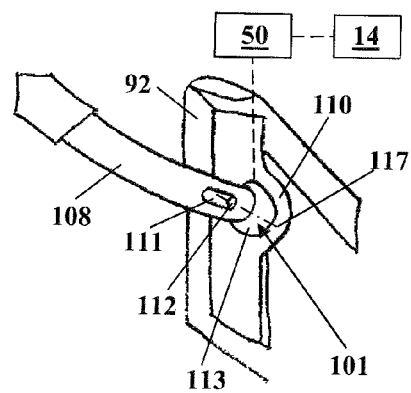
FIG. 19 is a schematic perspective illustration of the second fastening point of the connector arrangement.

As shown by the schematic sectional illustration in FIG. 19, the depression 110 is of approximately funnel-shaped form. On one side of the depression 110 there is provided a peg 112 which projects into a slot 111 of the second section 108. At the second fastening point 101, the peg 112 of the housing 92 of the blower 91 is pivotable relative to the second section 108 of the connector arrangement 99 about a horizontal pivot axis 117. The peg 112 is arranged on a sensor 113 which detects whether or not the second section 108 is arranged on the peg 112. The sensor 113 thus detects the connected state 94 and the disconnected state 95. The sensor 113 is connected to the controller 50 of the blower 91. In the connected state 94 illustrated in FIGS. 17 and 19, the full drive power of the drive motor 14 is available for the operation of the blower 91. If the operator fully actuates the operating lever 4, the blower unit 13 is driven with maximum blowing power. If the sensor 113 detects that the second section 108 has been detached from the blower 91, the maximum power available for the drive of the blower unit 13 is reduced. Even if the operator fully actuates the operating lever 4, the blower unit 13 is driven not with maximum power but with reduced power. In this way, the recoil force R in the disconnected state 95 is limited, and thus the load on the operator 19 during operation is reduced. If the blower 91 is connected to the backpack arrangement 102 by way of the connector arrangement 99 again, it is advantageously the case that the maximum power for the drive of the blower unit 13 is available again.

Figure 20:
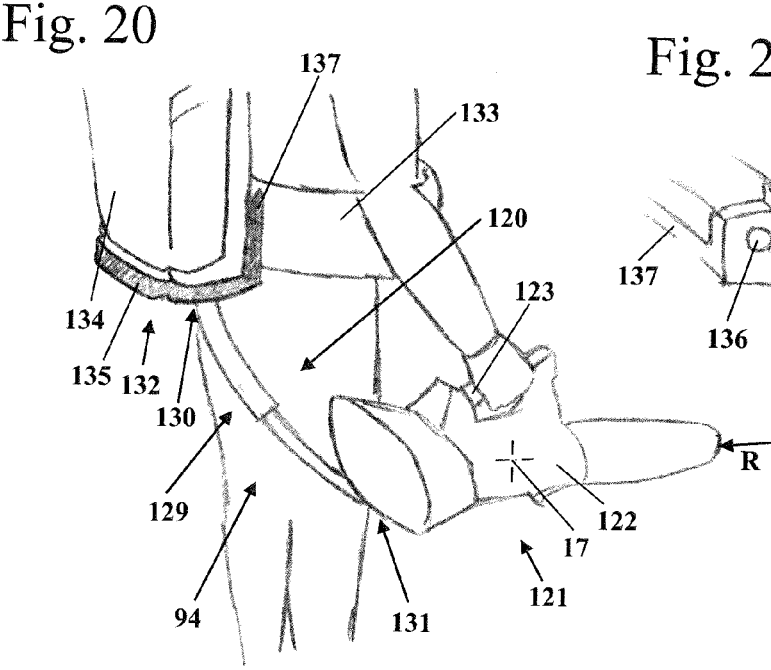
FIG. 20 is a schematic perspective illustration of an embodiment of a blower having a support device on an operator.

FIG. 20 shows an embodiment of a blower 121 which is connected by way of a support device 120 to a backpack arrangement 132. Here, FIG. 20 shows the connected state 94, in which, by way of the backpack arrangement 132, the recoil force R generated during operation by the outflowing blowing air, and the tilting moment generated owing to the lateral spacing (c) (FIG. 18) between the center of gravity 17 of the blower 121 and the first fastening point 130, are accommodated by the backpack arrangement 132. The blower 121 has a housing 122 on which there is provided a handle 123 for the directing of the blower 121 during operation. The support device 120 comprises a connector arrangement 129 which is fixed at a first fastening point 130 to a base plate 135 of the backpack arrangement 132. At a second fastening point 131, which is arranged on the underside of the housing 122 of the blower 121, the connector arrangement 129 is connected to the blower 121. In the embodiment, the connector arrangement 129 is of telescopic form such that the length of the connector arrangement 129 can be adapted by the operator. The connector arrangement 129, and also the connector arrangement 99, project laterally obliquely downward from the backpack arrangement 132. The backpack arrangement 132 is fixed to the operator not only by way of shoulder straps (not shown) but also by way of a waist strap 133. The backpack arrangement 132 comprises the base plate 135 and a backplate 137, which in the embodiment is arranged in the region of the waist strap 133. On the backpack arrangement 132 there is fixed an energy storage unit 134, in particular a battery. The energy line via which the energy storage unit 134 is connected to the blower 121 both in the connected state 94 and in the disconnected state 95 is not shown in FIG. 20.

Figure 21:
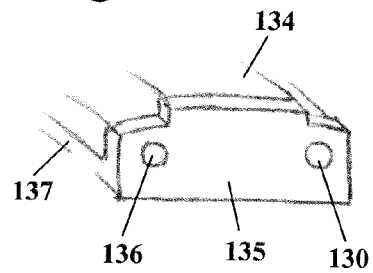
FIG. 21 is a schematic perspective view of the backpack from FIG. 20 from below.

FIG. 21 shows the base plate 135 from the side facing toward the base during operation. As shown in FIG. 21, adjacent to the first fastening point 130 arranged on the right-hand side of the base plate 135, the base plate 135 has a second, alternative fastening point 136 arranged on the left-hand side of the base plate 135. In this way, for directing the blower 121 using the right hand, the connector arrangement 129 can be fixed to the fastening point 130, and for directing the blower 121 using the left hand, the connector arrangement can be fixed to the alternative fastening point 136.

Figure 22:
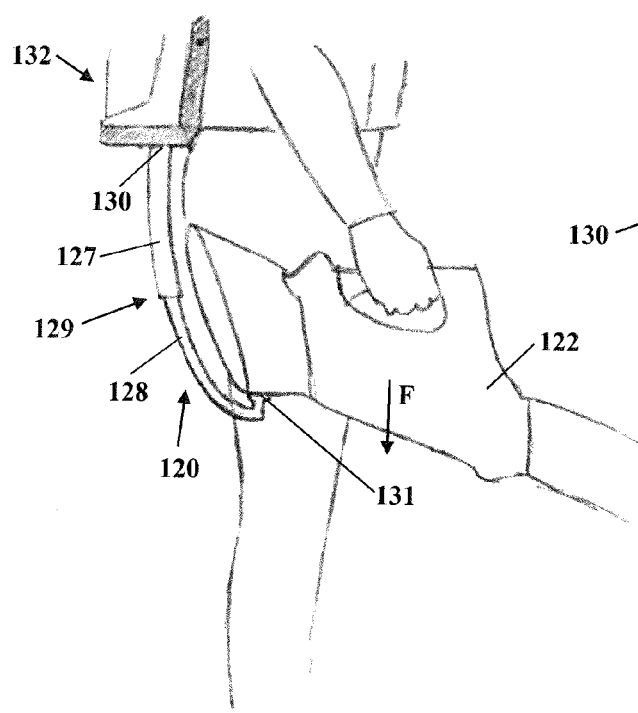
FIG. 22 is a schematic side view of an embodiment of a blower having a support device.

As shown in FIG. 22, the second fastening point 131 is arranged on the underside of the housing 122 in the rear region of the blower 121. In this way, during operation, a part of the weight force F of the blower 121 rests on the second fastening point 131 and is introduced via the support device 120 into the backpack arrangement 132. FIG. 22 also shows the construction of the connector arrangement 129 composed of a first section 127, which is fixed to the backpack arrangement 132 at the first fastening point 130, and a second section 128, which is connected in telescopic fashion to the first section 127 and which is connected to the housing 122 at the second fastening point 131.

Figure 23:
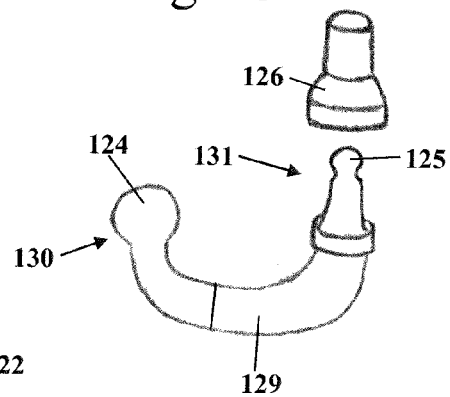
FIG. 23 is a schematic exploded illustration of the support device from FIG. 22.

FIG. 23 shows, schematically and in simplified form, the construction of the connector arrangement 129 at the first fastening point 130 and the second fastening point 131. At the first fastening point 130, the connector arrangement 129 has a ball head 124, which projects into a corresponding ball head receptacle of the backpack arrangement 132 and is thereby connected in positively locking fashion to the backpack arrangement 132. The connection at the first fastening point 130 is in this case in particular detachable. The ball head receptacle is configured such that, at the first fastening point 130, the tilting moment exerted by the weight force F owing to the lateral spacing between center of gravity 17 and fastening point 130 can be accommodated at the first fastening point 130. At the second fastening point 131, there is provided a ball head 125 which projects into a receptacle 126 of the housing 122. The ball head 125 and the receptacle 126 are coordinated with one another such that the blowing-out opening 8 of the blower 121 can, during operation, be pivoted upward and downward, and in a horizontal direction to the right and to the left, by the desired angle.

Figure 24:
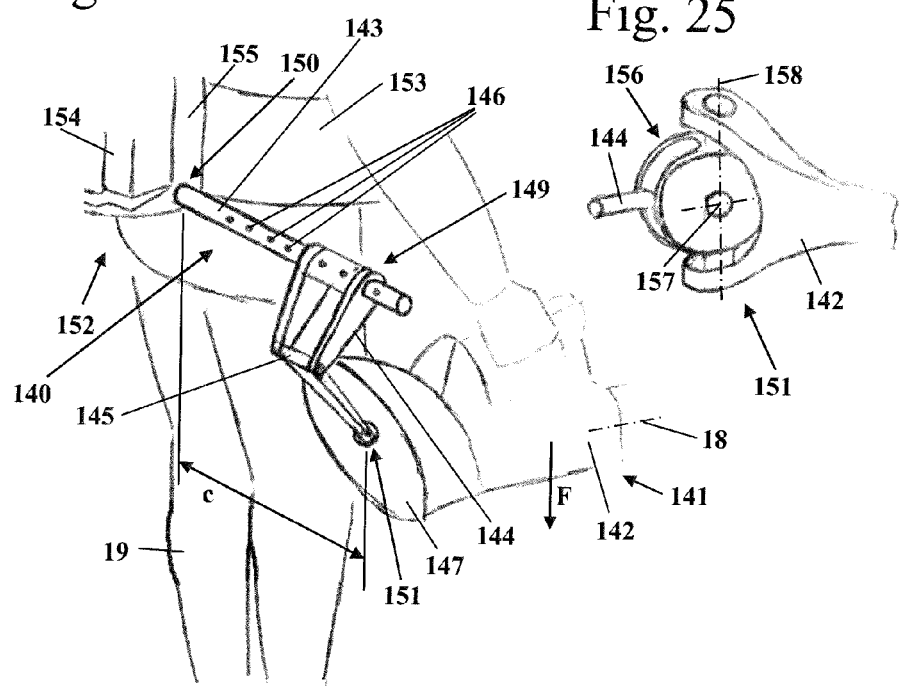
FIG. 24 is a schematic perspective illustration of an embodiment of a blower having a support device.

FIG. 24 shows an embodiment of a blower 141 which is supported by way of a support device 140 on a backpack arrangement 152. The backpack arrangement 152 comprises a backpack 155 on which there is arranged an energy storage unit 154, in particular a battery. An energy line (not shown in FIG. 24) is provided which connects the energy storage unit 154 and the blower 141. The support device 140 has a connector arrangement 149. A laterally projecting beam 143 of the connector arrangement 149 is fixed to the backpack 155. The beam 143 has fastening openings 146 to which an arm 144 of the connector arrangement 149 can be fixed in different positions. The arm 144 has, in the embodiment, a pivot joint 145. The arm 144 may however also be of rigid form. The arm 144 projects obliquely downward in a radial direction of the beam 143 in relation to the longitudinal central axis of the beam 143. On that end of the arm 144 which is averted from the beam 143 there is provided a second fastening point 151 at which the arm 144 is fixed to a housing 142 of the blower 141. Here, the second fastening point 151 is arranged in the region of an intake opening 147. The second fastening point 151 advantageously lies in an elongation of the longitudinal central axis 18 of the blowing tube 5. The second fastening point 151 particular advantageously lies in an elongation of the vector of the recoil force R (FIG. 4), such that the recoil force R is accommodated entirely at the second fastening point 151 and does not generate a moment about the second fastening point 151.

The beam 143 is fixed to the backpack 155 of the backpack arrangement 152 by way of a first fastening point 150. The first fastening point 150 is provided in the lower lateral region on the backpack 155. The backpack arrangement 152 furthermore comprises a waist strap 153. As shown in FIG. 24, the first fastening point 150 has a spacing (c), measured in a lateral direction of the operator and in a horizontal direction, to the second fastening point 151. Owing to the spacing (c), the weight force F of the blower 141 exerts a tilting moment on the first fastening point 150, which tilting moment is accommodated at the first fastening point 155 and discharged into the backpack 155.

Figure 25:
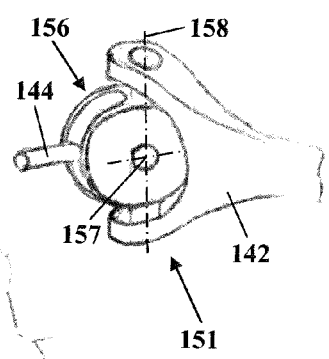
FIG. 25 is a schematic illustration of the second fastening point of the arrangement from FIG. 24.

FIG. 25 schematically shows the configuration of the second fastening point 151. At the second fastening point 151, there is provided a cardan joint 156 which connects the arm 144 to the housing 142 of the blower 141. The cardan joint has a first, horizontally running pivot axis 157 and a second, vertically running pivot axis 158. The first pivot axis 157 advantageously runs in a lateral direction, and thereby permits pivoting of the blowing-out opening upward and downward, whereas the second pivot axis 158 permits pivoting of the blowing-out opening to the right and to the left.

Figure 26:
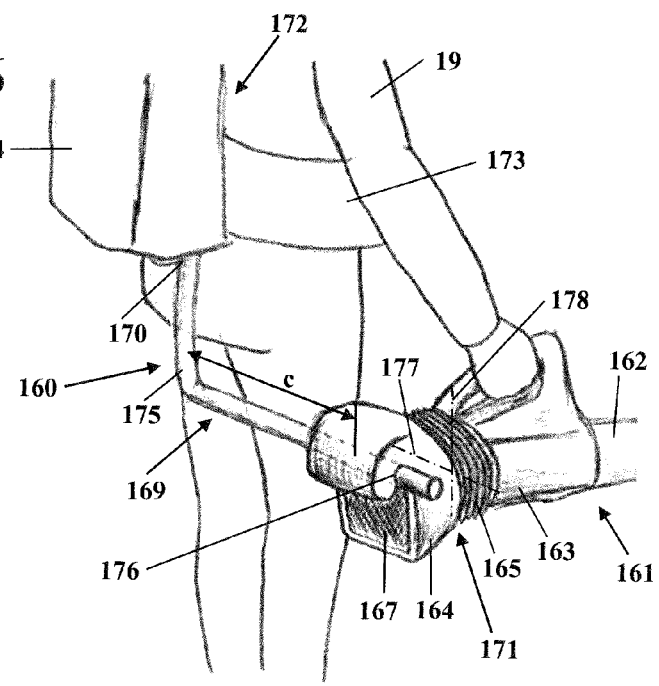
FIG. 26 is a schematic perspective illustration of a further embodiment of a blower having a support device.

FIG. 26 shows an embodiment of a support device 160 which is provided on a blower 161. The blower 161 has a housing 162 which has a first section 163 and a second section 164. The blower unit is arranged in the first section 163, and a nozzle with blowing-out opening can be arranged on the second section 164. A second section 164 of the housing 162 comprises the intake opening 167. Between the two sections 163 and 164 there is provided a pivot joint 165 which is formed in the manner of a corrugated bellows and which permits a movement of the first section 163 about a first, horizontally lying pivot axis 177 and about a second, vertically lying pivot axis 178. The first pivot axis 177 is in this case oriented in a lateral direction of the operator 19.

The support device 160 comprises a connector arrangement 169 which connects the blower 161 to a backpack arrangement 172. The backpack arrangement 172 comprises a waist strap 173 and shoulder straps (not shown). An energy storage unit 174 is fixed to the backpack arrangement 172. The connector arrangement 169 comprises an L-shaped bent beam 175 which is fixed, at a first fastening point 170, to the underside of the backpack arrangement 172. In the embodiment, one section of the beam 175 projects vertically downward from the first fastening point 170. The angled section of the beam 175 projects in a lateral direction, and approximately horizontally outward, relative to the operator 19. The second section 164 of the housing 162 of the blower 161 is hooked onto the beam 175. For this purpose, on the section 164 of the housing 162, there is formed a groove-like receptacle 176 which engages over the beam 175. The receptacle 176 advantageously partially encloses the beam 175 so as to yield a fixing with detent action. It may be provided that the receptacle 176 is held fixedly on the beam 175. It is however also possible for a pivoting movement of the section 164 of the housing 162 about the longitudinal axis of the bar 175 to be provided. The first section 163 of the housing 162 forms a part of the support device 160, and is fixed at a second fastening point 171 to the pivot joint 165. By way of the second section 164 and the beam 175, a part of the weight force F of the blower 161, and the recoil force R generated by the airstream emerging from the blowing tube 5, are accommodated.

Figure 27:
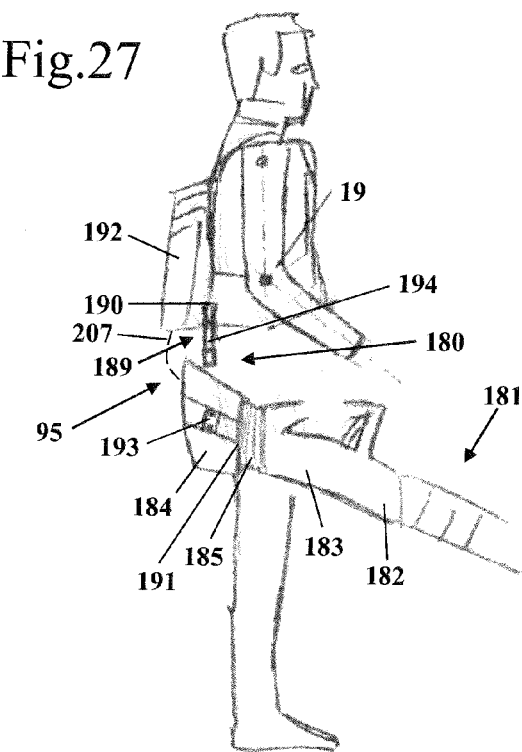
FIG. 27 is a schematic side view of a further embodiment of a blower having a support device.

FIG. 27 shows an embodiment of a blower 181 which can be connected by way of a support device 180 to a backpack arrangement 192. FIG. 27 shows the arrangement in the disconnected state 95. The blower 181 has a housing 182 with a first section 183 and a second section 184, which are articulately connected to one another by way of a pivot joint 185. In the embodiment, the pivot joint 185 is in the form of a bellows. Some other form of the pivot joint 185 may however also be advantageous. At the pivot joint 185, the two sections 183 and 184 are pivotable relative to one another about a horizontal axis and about a vertical axis. The support device 180 comprises a connector arrangement 189 which is fixed to the backpack arrangement 192 at a first fastening point 190. A second fastening point 191 is formed at the connecting point of the first section 183 of the housing 182 to the second section 184 of the housing 182. As shown in FIG. 27, in the disconnected state 95, the backpack arrangement 192 is connected to the blower 181 by way of an energy line 207. The connector arrangement 189 comprises a connecting element 194, which is in the form of a lever linkage. The connecting element 194 can be connected at a connecting point 193 to the second section 184 of the housing 182. In the disconnected state 95 shown in FIG. 27, the connecting element 194 and the second section 184 of the housing 182 are not connected to one another. The connections at the first fastening point 190 and at the second fastening point 191 are non-detachable.

Figure 28:
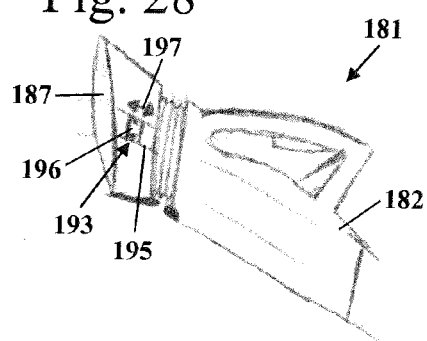
FIG. 28 is a schematic enlarged side view of the blower from FIG. 27.

As shown in FIG. 28, the connecting point 193 is provided on a longitudinal side of the blower 181, adjacent to an intake opening 187. At the connecting point 193, there is provided a rail 195 in which a fastening element 196 is mounted so as to be longitudinally displaceable in the direction of the double arrow 197. In this way, it is possible to set an attachment point of the connecting element 194 to the second section 184 of the housing 182 which is ergonomic for the operator.

Figure 29:
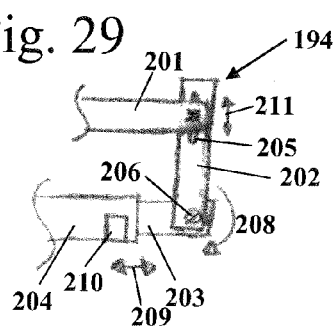
FIG. 29 is a schematic illustration of a connecting element of the connector arrangement from FIG. 27.

FIG. 29 shows the configuration of the connecting element 194 schematically in detail. The connecting element 194 has a first section 201 on which a second section 202 is held so as to be displaceable in the direction of a double arrow 211. For this purpose, the second section 202 has a slot 205 at the connecting point to the first section 201. A third section 203 is mounted on the second section 202 by way of a pivot joint 206 so as to be pivotable as indicated by the arrow 208. A fourth section 204 is mounted on the third section 203 in telescopic longitudinally displaceable fashion in the direction of the double arrow 209. A detent element 210 is provided for fixing the sections 203 and 204 relative to one another. In the embodiment, the sections 201, 202, 203 and 204 are in the form of levers.

Figure 30:
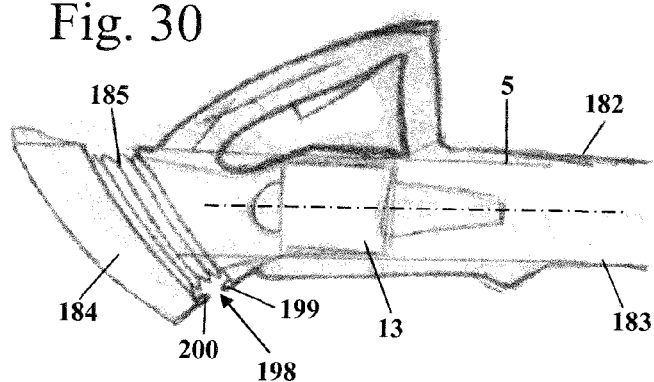
FIG. 30 is a schematic sectional illustration of the blower from FIG. 27.

As shown in FIG. 30, a stop 198 is provided between the first section 183 and the second section 184 at the pivot joint 185. The stop 198 comprises a first stop element 199, which is fixed to the first section 183, and a second stop element 200, which is fixed to the second section 184. The stop elements 199 and 200 bear against one another in the compressed state of the pivot joint 185. The stop 198 limits the maximum travel by which the pivot joint 185 can be compressed.

Figure 31:
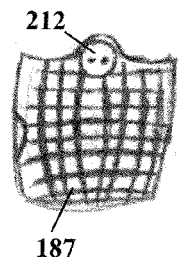
FIG. 31 is a schematic view of the air intake opening of the blower from FIG. 27.

FIG. 31 shows a view of the intake opening 187. A plug socket 212 is provided on the intake opening 187 in the upper middle region, into which plug socket the energy line 207 (FIG. 27) can be plugged.

Figure 32:
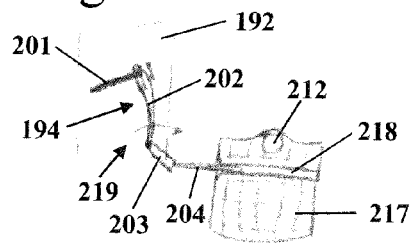
FIG. 32 is a schematic side view of a configuration variant for the intake opening and a connector arrangement.
Figure 33:
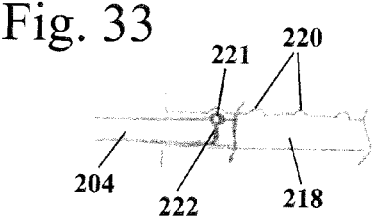
FIG. 33 is a schematic illustration of the connection of the connector arrangement to the intake opening in an enlarged illustration.

FIGS. 32 and 33 show an alternative attachment of the connecting element 194 to an intake opening 217. The first section 201 is fixed to a backpack arrangement 192. The fourth section 204 projects into a groove 218 on an intake opening 217 of a blower. As shown in FIG. 33, the groove 218 has, on one longitudinal side, detent depressions 220. The fourth section 204 bears a detent element 221 which is mounted resiliently by way of a spring element 222. The illustration in FIG. 33 is merely schematic. Any suitable detent means may be provided. By way of the detent means, the fourth section 204 can be fixed on the intake opening 217 in different positions. The connecting element 194 is part of a connector arrangement 219.

Figure 34:
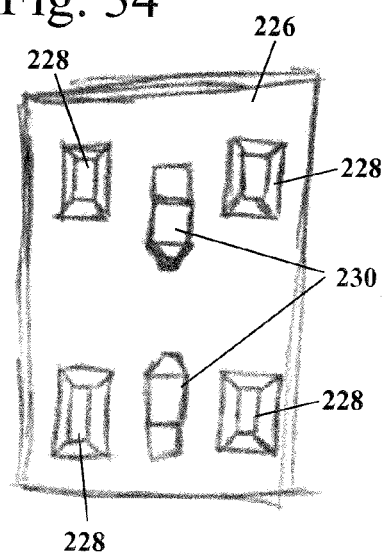
FIGS. 34 and 35 are schematic side views of a fastening plate.
Figure 35:
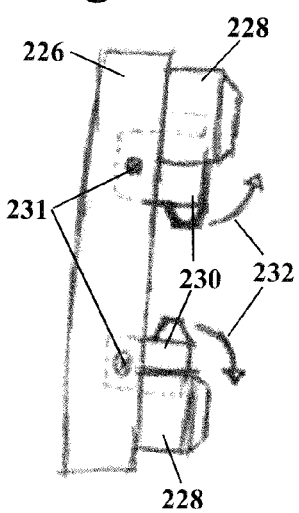
Figure 36:
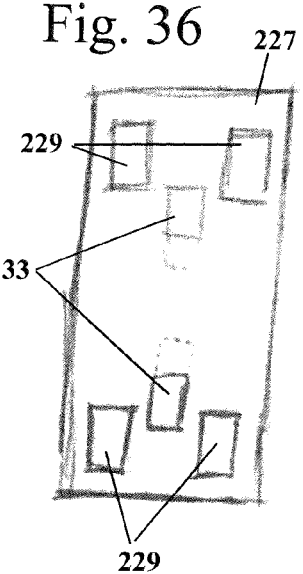
FIG. 36 is a counterpart plate with respect to the fastening plate from FIGS. 34 and 35, in a schematic side view.

FIGS. 34 to 36 show an alternative attachment of a connector arrangement to a bracket, for example of a backpack arrangement, or to a blower. A fastening plate 226 and a counterpart plate 227 are provided. The fastening plate 226 and the counterpart plate 227 can be connected to one another and detached from one another. The fastening plate 226 and counterpart plate 227 may be provided at a first fastening point, at a second fastening point or between two sections of a connector arrangement. Here, the fastening plate 226 is part of the connector arrangement and the counterpart plate 227 is provided for arrangement on the bracket or on the blower, or the fastening plate 226 is provided on the bracket or on the blower and the counterpart plate 227 is part of the connector arrangement. The fastening plate 226 has multiple pegs 228. In the embodiment, four pegs 228 are provided which, for ease of insertion, are of bevelled form. The fastening plate 226 furthermore has two locking elements 230 which are in each case pivotably mounted by way of a pivot bearing 231. The pivoting movement of the locking elements 230 is indicated in FIG. 35 by the arrow 232.

The counterpart plate 227 has depressions 229 for the pegs 228. The depressions 229 may also be in the form of openings into which the pegs 228 engage. For the locking elements 230, depressions 233 are provided. In the locked state, the locking elements 230 engage behind the edge of the depressions 233 and are thereby fixed to the counterpart plate 227. The depressions 233 may also be in the form of openings.

Figure 37:
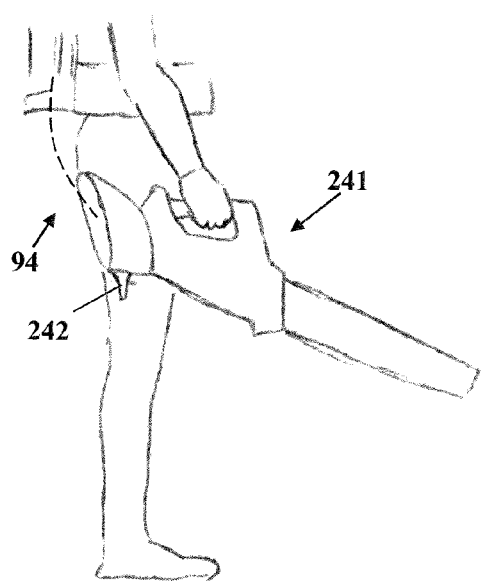
FIG. 37 is a schematic side view of an embodiment of a blower.
Figure 38:
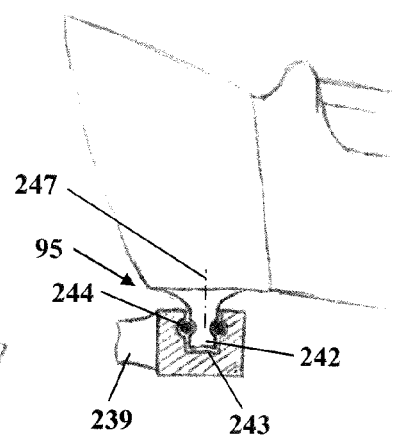
FIG. 38 is the second fastening point of the blower from FIG. 37 in a partially sectional, enlarged schematic illustration.
Figure 39:
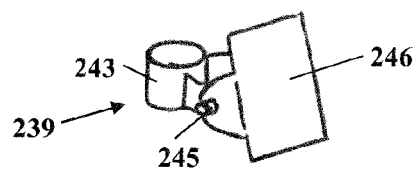
FIG. 39 is a schematic perspective illustration of the connector arrangement.

FIG. 37 shows a blower 241 being worn by an operator, which blower is provided for connection to a backpack by way of a connector arrangement 239 shown schematically in FIG. 39. FIG. 37 shows the blower 241 in the disconnected state 94. The connector arrangement 239 comprises a peg 242 which, as shown in FIG. 38, projects into a receptacle 243 of the connector arrangement 239 in the connected state 95. The peg is pivotable in the receptacle 243 about a pivot axis 247 which, in the embodiment, is arranged vertically. To fix the peg 242 in the receptacle 243 in the direction of the pivot axis 247, a detent element 244 is provided which may for example be a resilient ring. As is schematically shown in FIG. 39, the connector arrangement 239 comprises a section 246 which is connected to the receptacle 243 by way of a pivot joint 245. The section 246 may be fixed directly to the backpack or connected to the backpack by way of further elements.

Figure 40:
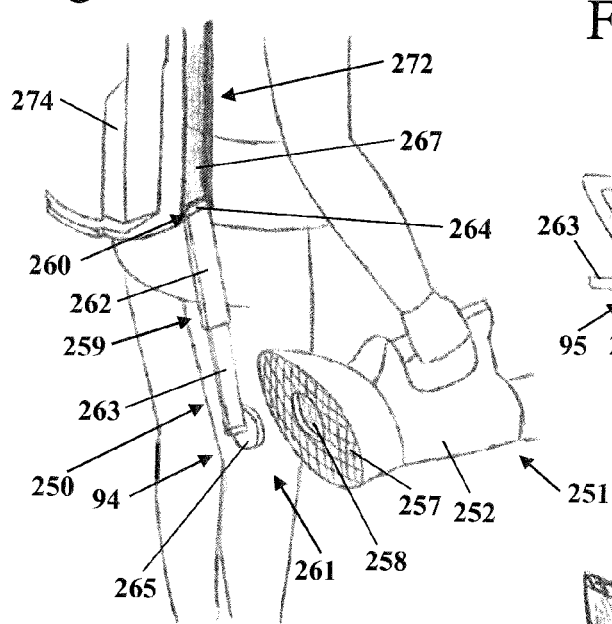
FIG. 40 is a schematic perspective illustration of an embodiment of a blower having a support device.

FIG. 40 shows an embodiment of a blower 251 which is connected to a backpack arrangement 272 by way of a support device 250. The blower 251 has a housing 252 which has an intake opening 257 on its side which faces rearward during operation. In the grill which covers the intake opening 257, there is provided, approximately centrally, a receptacle 258 for a connector arrangement 259. The connector arrangement 259 is fixed, at a first fastening point 260, to the backpack arrangement 272. At a second fastening point 261, the connector arrangement 259 is not connected to the blower 251 in the disconnected state 94 shown in FIG. 40. The first fastening point 260 is arranged at the lower end of the right-hand longitudinal side of the backpack arrangement 272 relative to the operator 19. The connector arrangement 259 is connected by way of a pivot joint 264 to the backpack arrangement 272. An energy storage unit 274, in particular a battery, is fixed to the backpack arrangement 272. The connector arrangement 259 comprises a first section 262, which is held on the pivot joint 264, and a second section 263, which can be slid telescopically into the first section 262. On that end of the second section 263 which is averted from the first section 262, there is held a connecting plate 265 which can be fixed in the receptacle 258.

As shown in FIG. 40, the backpack arrangement 272 has, on its right-hand longitudinal side, a depression 267 which serves for receiving the connector arrangement 259 in the disconnected state 94. For this purpose, the two sections 262 and 263 have been slid one inside the other and subsequently, by way of the pivot joint 264, folded against the backpack arrangement 272 until the connector arrangement 259 lies at least partially in the depression 267. Equipment is advantageously provided for fixing the connector arrangement 259 in the depression 267.

Figure 41:
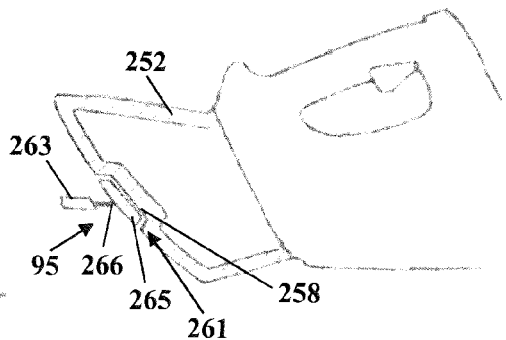
FIG. 41 is a schematic sectional illustration through the second fastening point of the blower from FIG. 40.

FIG. 41 shows the connected state 95 in a detail. In the state, the connecting plate 265 is arranged in the receptacle 258 at the second fastening point 261. The connecting plate 265 may for example be fixed in the receptacle 258 by way of a magnetic connection. Some other manner of fixing may also be advantageous. The connecting plate 265 is connected to the second section 263 by way of a pivot bearing 266. The pivot bearing 266 advantageously permits pivoting movements in a lateral direction and about a horizontal pivot axis. The connecting plate 265 is in particular spring-loaded.

Figure 42:
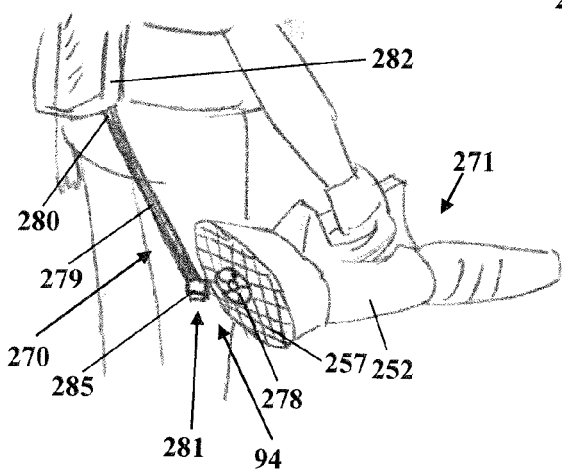
FIG. 42 is a schematic perspective illustration of a further embodiment of a blower having a support device.

FIG. 42 shows an embodiment of a blower 271 which is connected by way of a support device 270 to a backpack arrangement 282. The support device 270 comprises a connector arrangement 279 which is fixed, at a first fastening point 280, to the backpack arrangement 282. The first fastening point 280 is provided at the lower edge of the backpack arrangement 282 situated at the right-hand side in relation to the operator 19. The connector arrangement 279 projects laterally obliquely downward and is in the form of a rigid bar. At its end averted from the first fastening point 280, the connector arrangement 279 has a connecting element 285 which serves for the connection to a receptacle 278 of the housing 252 of the blower 271 at a second fastening point 281. The housing of the blower 271 is of identical form to the housing 252 of the blower 251 and differs merely by the receptacle 278. As in the embodiment as per FIG. 40, the receptacle 278 is arranged centrally in a receiving opening 257 of the blower 271. FIG. 42 shows the arrangement in the disconnected state 94, in which the connecting element 285 is not arranged in the receptacle 278. FIG. 42 does not show an energy line which connects the blower 271 to the backpack arrangement 282 even in the disconnected state 94.

Figure 43:
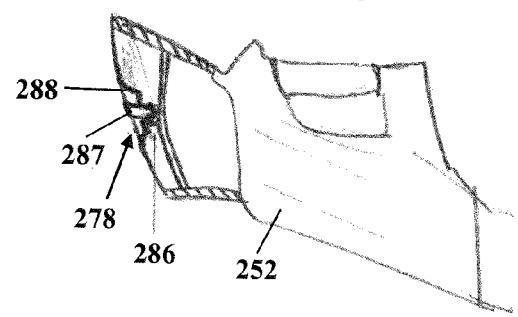
FIG. 43 is a schematic illustration of a partial section through the blower from FIG. 42.

FIG. 43 schematically shows the receptacle 278. The receptacle 278 comprises a coupling 287 which is held on the housing 252 by way of a joint 286 and which can thereby align itself relative to the connecting element 285. The coupling 287 is arranged in a depression 288, which is advantageously of funnel-shaped form, such that the connecting element 285 is guided to the coupling 287 by the walls of the depression 288. The coupling 287 may for example be a magnetic coupling.

Figure 44:
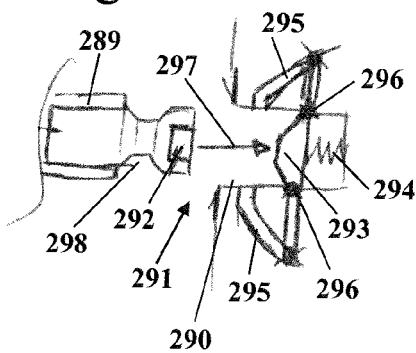
FIG. 44 is a schematic illustration of a configuration variant for the second fastening point.

FIG. 44 schematically shows an embodiment of a magnetic coupling. The connector arrangement 289, which serves for connection to a backpack arrangement, bears a magnet 292. On the blower there is formed a receptacle 290, on the base of which there is provided an actuating element 293 which is mounted resiliently by way of a spring 294. Two holding arms 295 are connected to the actuating element 293, which holding arms are connected to the actuating element 293 in each case by way of a pivot bearing 296. If the connector arrangement 289 is moved into the receptacle 290 in the direction of the arrow 297, the actuating element 293 is moved to the right in FIG. 44, counter to the force of the spring 294. The holding arms 295 have counter bearings which prevent a movement of the holding arms 295 to the right in FIG. 44. In this way, the pivot arms 295 pivot, at the pivot bearings 296, into the receptacle 290 and engage into a depression 298 of the connector arrangement 289. The connector arrangement 289 is thus secured in positively locking fashion. The arrangement is advantageously provided at a second fastening point 291.

In all of the embodiments, the support device (20, 90, 120, 140, 160, 180, 270) supports the work apparatus such that the tilting moment exerted by the weight force of the work apparatus on the first fastening point owing to the lateral spacing a, c is at least partially supported. It is advantageously additionally the case that the weight force F of the work apparatus and/or the recoil force R generated by a blowing air stream emerging from the blower is at least partially, advantageously entirely, accommodated.

Position statements such as "in front of", "behind", "to the side of", "top", "bottom" et cetera relate, in all of the embodiments, to the operator 19 and to a working position 10 of the blower.

It is understood that the foregoing description is that of the preferred embodiments of the invention and that various changes and modifications may be made thereto without departing from the spirit and scope of the invention as defined in the appended claims.

What is claimed is:

1. An assembly comprising:
    a hand-guided work apparatus having a work position; and, a support for supporting said work apparatus during operation thereof;
    said work apparatus having a housing and drive unit mounted in said housing;
    said work apparatus defining a center of gravity whereat a weight force (F) of said work apparatus acts;
    said work apparatus further including at least one handle on said housing for guiding said work apparatus during said operation thereof;
    said support including a holder to be worn by an operator and a connector arrangement for connecting said work apparatus to said holder;
    said connector arrangement having a first attachment whereat said connector arrangement is held on said holder and a second attachment whereat said connector arrangement is held on said work apparatus;
    said second attachment being configured to pivotally journal said connector arrangement so as to permit said connector arrangement to pivot about at least one pivot axis;
    said connector arrangement being further configured to rearwardly brace said work apparatus referred to the operator so as to prevent a backward movement of said work apparatus;
    said center of gravity of said work apparatus and said first attachment conjointly defining a lateral distance (a, c) therebetween measured in a horizontal and lateral direction referred to the operator when said work apparatus is in said work position; and,
    said holder including, at said first attachment, a bracing device for at least partially supporting a tilting moment acting on said first attachment and caused by said weight force (F) applied at said lateral distance (a, c) from said first attachment.

2. The assembly of claim 1, wherein said distance (a, c) lies in a range of 5 cm to 15 cm.

3. The assembly of claim 1, wherein said second attachment and said center of gravity lie in a common vertical plane.

4. The assembly of claim 3, wherein said center of gravity lies approximately perpendicularly under said second attachment.

5. The assembly of claim 3, wherein said work apparatus is a blower having a blower tube through which a blower air flow is moved during said operation; and, said connector arrangement is further configured to take up the recoil force (R) occurring during said operation generated by the blower air flow exiting from said blower tube.

6. The assembly of claim 5, wherein said blower tube defines a longitudinal axis and said second attachment and said longitudinal axis both lie in said common vertical plane.

7. The assembly of claim 1, wherein said work apparatus, in said work position, is at a distance (b) to said holder measured in a lateral direction referred to said operator.

8. The assembly of claim 1, wherein said connector arrangement is pivotally journalled at said second attachment so as to be pivotable about a vertical pivot axis.

9. The assembly of claim 1, wherein said connector arrangement is pivotally journalled at said second attachment so as to be pivotable about a horizontal pivot axis.

10. The assembly of claim 1, wherein said second attachment is configured to define a ball joint.

11. The assembly of claim 1, wherein said connector arrangement includes a connecting pin.

12. The assembly of claim 11, wherein said connecting pin, in said work position of said work apparatus, projects outwardly from said holder approximately in a horizontal and lateral direction referred to the operator.

13. The assembly of claim 11, wherein said housing has a housing receptacle formed therein and said connecting pin is movably mounted in said housing receptacle.

14. The assembly of claim 13, wherein said connector arrangement includes means for centering said connecting pin in said housing receptacle.

15. The assembly of claim 11, wherein said connecting pin can project out of said housing at mutually opposite sides of said housing.

16. The assembly of claim 1, wherein the connection between said work apparatus and said holder is releasable.

17. The assembly of claim 1, wherein said holder has a receptacle for said connector arrangement and said receptacle has at least one rail; and, said connector arrangement includes a plate mounted on said first attachment and said plate is configured to engage behind said at least one rail.

18. The assembly of claim 1, further comprising a back carrier and an energy-storage unit mounted thereon and said holder being configured on said back carrier; and, an energy line connecting said energy-storage unit to said work apparatus.

19. A hand-guided work apparatus having a work position and defining a center of gravity, said work apparatus comprising:
    a housing and a drive unit mounted in said housing;
    at least one handle on said housing for guiding said work apparatus during operation thereof;
    a connector arrangement projecting out from said housing;
    an attachment location;
    said connector arrangement being pivotally journalled at said attachment location so as to be pivotable about at least one pivot axis;

said attachment location and said center of gravity in said work position both lying in a common vertical plane;
said work apparatus defining a longitudinal direction and said common vertical plane being aligned in said longitudinal direction; and,
a connecting pin projecting outwardly from said housing approximately in a horizontal and lateral direction referred to an operator.

* * * * *